June 20, 1939.  R. J. HARRY  2,163,090
JOURNAL BEARING LINING
Filed Jan. 15, 1936  2 Sheets-Sheet 1
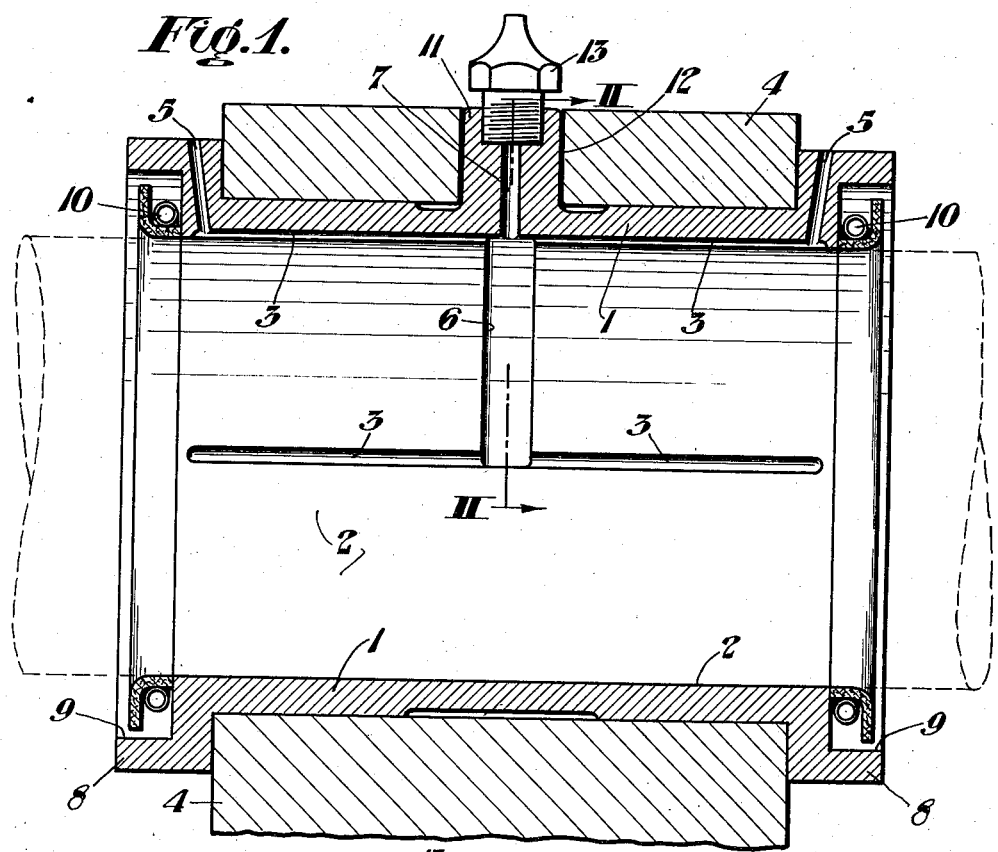
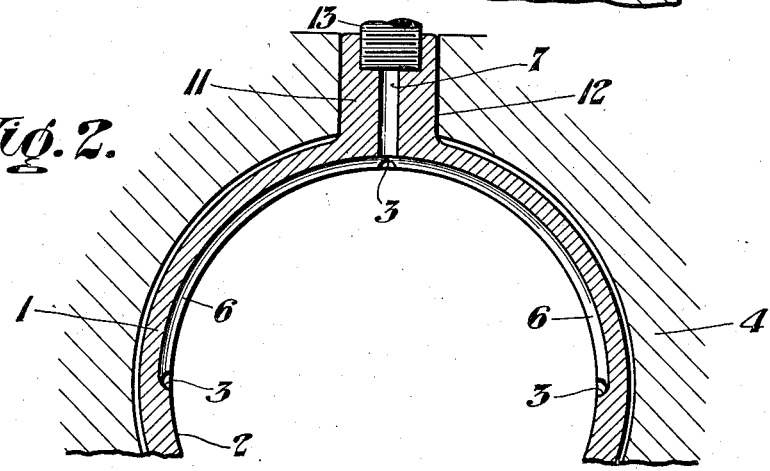
Inventor:
ROBERT J. HARRY,
by John E. Jackson
his Attorney.

June 20, 1939.  R. J. HARRY  2,163,090
JOURNAL BEARING LINING
Filed Jan. 15, 1936   2 Sheets-Sheet 2
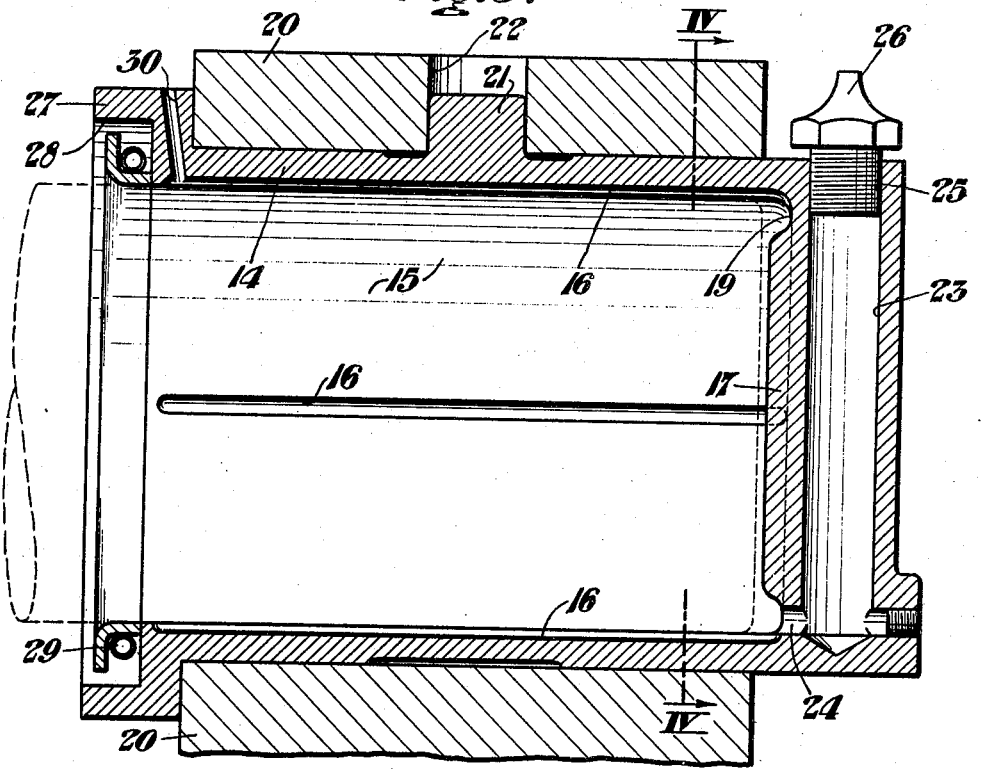
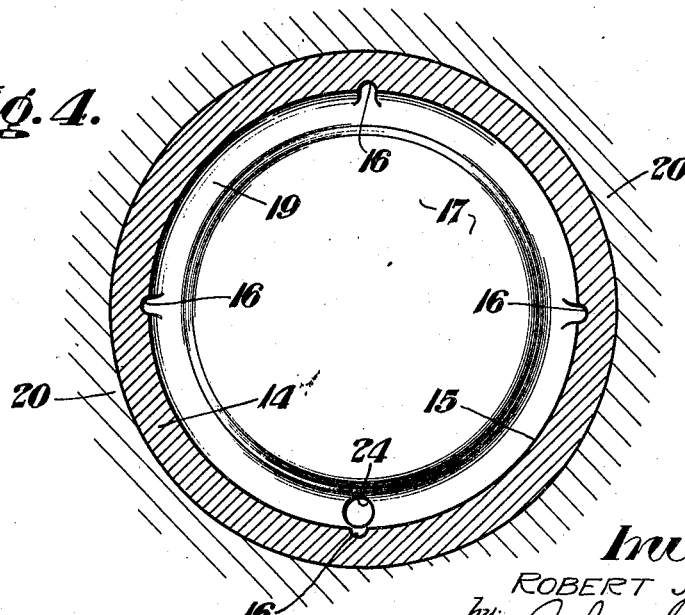
Inventor
ROBERT J. HARRY,
by: John E. Jackson
his Attorney.

Patented June 20, 1939

2,163,090

UNITED STATES PATENT OFFICE 2,163,090

JOURNAL BEARING LINING

Robert J. Harry, Alliance, Ohio, assignor to The Alliance Machine Company, a corporation of Ohio Application January 15, 1936, Serial No. 59,240

2 Claims. (Cl. 308—240)

The invention relates to journal bearings of the type that include a relatively thin-walled lining that is supported by a bearing housing, one of the objects being to provide a bearing of this type that requires lubrication only periodically and, when lubricated, does not permit undue loss of lubricant from or permit the entrance of foreign matter to either its bearing surface or the working surface of a journal mounted by this bearing. Other objects may be inferred.

Specific examples of journal bearings embodying the principles of the present invention are illustrated by the accompanying drawings, in which:

Figure 1 is a longitudinal section of one example.

Figure 2 is a cross-section from the line II—II in Figure 1.

Figure 3 is a longitudinal section of a second example.

Figure 4 is a cross-section from the line IV—IV in Figure 3.

The lining of the first of these illustrated examples comprises a unitary tubular body 1 having its inside finished to provide a cylindrical journal bearing surface 2 that includes one or more longitudinally extending lubricant distributing grooves 3 and has open ends so that a journal may pass therethrough and be carried by this bearing surface 2.

The wall of the lining is relatively thin and is adapted to be supported by a bearing housing 4. The lining is provided with vent holes 5 for the opposite ends of the top one of the grooves 3, and it integrally includes an internal lubricant reservoir 6 provided with an externally accessible inlet 7 and arranged to centrally communicate with the lubricant distributing grooves 3. This reservoir has sufficient capacity to supply lubricant to the bearing surface 2 by way of the grooves 3 for an appreciable operating period when filled with lubricant by way of its inlet 7. That is to say, this reservoir is relatively deep and large and is adapted to contain a much greater amount of lubricant than are the grooves ordinarily provided in bearing linings. The body 1 constituting this lining also includes integral flanged ends 8 that fit closely against the bearing housing 4 and which are recessed, as at 9, to provide an annular means surrounding both of the open ends of the body and adapted to mount suitable lubricant seals 10. The inlet 7 may be formed by an integrally projecting part 11 of the body 1 that fits in a hole 12 formed in the bearing housing 4 for this purpose. This part 11 serves to position the lining against rotation in the housing and to, at the same time, provide for the mounting of a suitable fitting 13.

A bearing constructed in the manner just described is distinguished by the fact that the bearing lining constitutes a unitary element with the various parts mentioned integral therewith. Since it functions as a unit, there is little chance for the escape of any lubricant, such escape being practically eliminated by the provision of the lubricant seals directly between the journal and the bearing lining itself. The vent holes 5 function to permit proper internal flow of lubricant through the lining. The manner in which the lubricant may be introduced to the reservoir 6 is apparent.

Referring now to the second example of the invention:

In this instance the lining of the bearing comprises a unitary tubular body 14 having its inside finished to provide a cylindrical bearing surface 15. The latter also includes a number of circumferentially spaced longitudinally extending lubricant distributing grooves 16. The body of this bearing is distinguished from the other in that it has but one open end through which a journal may pass to the surface 15, its other end 17 being an integral closed end and having its inside finished to provide a flat bearing surface 18 to take the thrust of a journal carried by the cylindrical bearing surface 15. The inside surfaces of this lining include an annular groove 19 at the junction of the bearing surfaces and which communicates with the grooves 16.

As was the case with the other lining, the body 14 has a side wall that is relatively thin and which is therefore adapted to be supported by a bearing housing 20. The outside of this wall may include a projection 21 that extends into a hole 22 formed in the housing 20 and which functions to prevent rotation of the bearing lining respecting this housing.

The wall of the closed end 17 is relatively thick so as to enable it to withstand the thrust of the journal. This thrust will be transmitted to the remainder of the lining in the form of tension which the cylindrical wall can withstand although it is relatively thin. The closed end 17 includes an integral lubricant reservoir 23 which communicates with the annular groove 19 by way of an opening 24 and which also has sufficient capacity to supply the bearing surfaces 15 and 18 with lubricant by way of the grooves 19 and 16 for an appreciable operating period when filled with lubricant. This reservoir 23 is provided with an externally accessible inlet 25 which may be fitted with a fitting 26, as was the case in the first example.

Likewise, its open end includes an integral flange 27 that surrounds this end and which is recessed, as at 28, to provide an annular retaining means for a lubricant seal 29 of any suitable type. Furthermore, a vent hole 30 is formed so as to open from the top one of the grooves 14 at the end of the same most remote from the annular groove 19.

This secondly described bearing has substantially the same advantages as the other. In addition, it provides a bearing surface that takes the journal thrust. This is provided by the bearing lining itself, which functions as a unit isolated from the bearing housing. Then vent 30 provides for the proper feeding of the lubricant from the reservoir 23 onto the various bearing surfaces by way of the grooves 16 and 19. The provision of the seal 29 between the journal and the lining itself serves to further complete the latter's isolation so as to prevent the escape of lubricant or the entrance of foreign matter. In this instance the difference between the provision of an integral reservoir 23 and the mere inclusion of lubricant grooves supplied from some outside source is very apparent.

Both the linings that have been disclosed may be cast from suitable bearing metals so as to provide the integral and unitary constructions described. It is not necessary to describe the making of these linings, it being obvious that no particular manufacturing problems are involved.

Although specific examples of the invention have been disclosed in accordance with the patent statutes, it is to be understood that the scope of the invention is not to be limited exactly thereto, except as defined by the following claims.

I claim:

1. A journal bearing lining comprising a unitary tubular body having its inside finished to provide a cylindrical journal bearing surface, said body having an open end through which a journal may pass to said cylindrical bearing surface and an integral closed end having its inside finished to provide a flat bearing surface to take the thrust of a journal carried by said cylindrical bearing surface, the side wall of said body being relatively thin and adapted to be supported by a bearing housing and the wall of said closed end of the same being relatively thick so as to be self-supporting and integrally including an internal lubricant reservoir that communicates with both said bearing surfaces and which has sufficient capacity to supply the latter with lubricant for an appreciable operating period when filled with lubricant, said wall of said closed end being adapted to project free from a bearing housing supporting said side wall and said reservoir being provided with an externally accessible inlet, said body including an annular lubricant seal retaining means surrounding said open end.

2. A journal bearing lining comprising a unitary tubular body having its inside finished to provide a cylindrical journal bearing surface that includes at least one longitudinally extending lubricant distributing groove, said body having an open end through which a journal may pass to said cylindrical bearing surface and an integral closed end having its inside finished to provide a flat bearing surface to take the thrust of a journal carried by said cylindrical bearing surface, the inside surfaces of said body including an annular groove at least approximately at the junction of said bearing surfaces and which communicates with the first named groove, the side wall of said body being relatively thin and adapted to be supported by a bearing housing and the wall of said closed end of the same being relatively thick and integrally including an internal lubricant reservoir that communicates with said annular groove and which has sufficient capacity to supply said bearing surfaces with lubricant by way of said grooves for an appreciable operating period when filled with lubricant, said reservoir being provided with an externally accessible inlet and said body including an integral flange that surrounds its open end and which is recessed to provide an annular lubricant seal retaining means, and a vent hole located at the end of the first named groove most remote from said annular groove.

ROBERT J. HARRY.